UNITED STATES PATENT OFFICE 2,786,830
Patented Mar. 26, 1957

2,786,830
TETRAKISAZO-DYESTUFFS

Richard Fleischhauer, Frankfurt am Main Fechenheim, Germany, assignor to Cassella Farbwerke Mainkur Aktiengesellschaft, Frankfurt am Main Fechenheim, Germany, a company of Germany No Drawing. Application November 10, 1953, Serial No. 391,394

Claims priority, application Germany November 28, 1952

4 Claims. (Cl. 260—166)

This invention relates to tetrakisazo-dyestuffs which possess a good solubility and affinity for the fibre.

The tetrakisazo-dyestuff obtained by alkaline coupling of the tetrazo compound of 4,4'-diamino-diphenylamine-2-sulfonic acid with 2 moles of 2-amino-8-hydroxynaphthalene-6-sulfonic acid, further tetrazotizing of the disazo-dyestuff thus obtained, and combining the tetrazo compound with 2 moles of 1,3-diamino-benzene is of importance for the dyeing of cotton and rayon because of its fastness properties and very good dischargeability.

But this dyestuff has the disadvantage of moderate solubility, especially in the presence of common salt or in hard water. In order to achieve a complete dissolution of the dyestuff, it is necessary to use considerable amounts of sodium carbonate which is undesired when dyeing rayon.

If the dyestuff is applied without the use of sodium carbonate, weak shades are obtained; furthermore the depth of the shades obtained varies according to the temperature and hardness of the water employed for the dyeing.

Therefore this known dyestuff requires special precautions if full shades are to be obtained. A similar behaviour is shown also by the corresponding dyestuff obtained according to British patent specification No. 470,407 which dyestuff contains 1-hydroxy-ethylamino-3-aminobenzene as terminal component but otherwise has the same composition.

Also the dyestuffs obtained according to U. S. patent specification No. 2,653,929 by alkaline coupling of the tetrazo compound of 4,4'-diamino-diphenylamine-2-sulfonic acid with 2 moles of equal or different amino-hydroxynaphthalene-sulfonic acids being capable of coupling and diazotizing, further tetrazotizing of the disazo-dyestuffs thus obtained and combining the tetrazo compounds with 2 moles of a mixture consisting of a 1,3-diamino-benzene and a compound of the naphthalene series being capable of coupling show the same drawbacks, i. e. they can be used only with special precautions to obtain full shades.

It has now been found, surprisingly, that dyestuffs can be obtained which do not possess the aforesaid disadvantage, by combining tetrazo compounds of disazo-dyestuffs of the general formula $$A \begin{matrix} N=N-B_1 \\ \diagdown \\ N=N-B_2 \end{matrix}$$

(wherein A means the residue of a 4,4'-diamino-diphenylamine-2-sulfonic acid which may contain in the benzene nuclei further substituents, $B_1$ means the residue of the 1-amino-5-hydroxy-naphthalene-7-sulfonic acid, $B_2$ the residue of the equal or of another amino-hydroxy-naphthalene-sulfonic acid being capable of coupling and diazotizing) with 2 moles of a 1,3-diamine of the benzene series, which contains no solubilizing groups.

The new dyestuffs correspond to the general formula

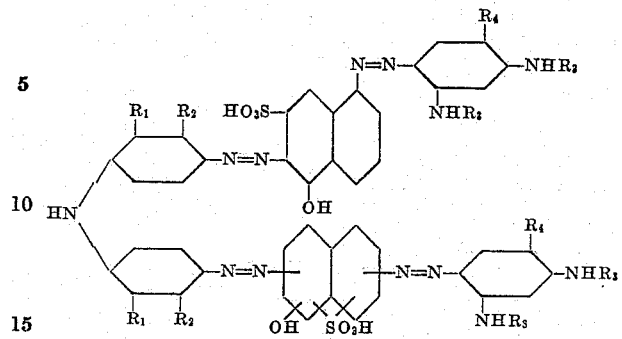

wherein:

one $R_1$ means hydrogen, the other $R_1$ a sulfonic acid group;

one $R_2$ means hydrogen, the other $R_2$ a radical of the group consisting of hydrogen, methyl, methoxy, carboxylic acid and sulfonic acid group;

$R_3$ means a radical of the group consisting of hydrogen and hydroxyalkyl;

$R_4$ means a radical of the group consisting of hydrogen, methyl and methoxy.

They furnish, as compared to the said known dyestuffs, dyeings of an equal depth of shade independently of the conditions of dyeing. Furthermore, they possess a very good affinity for the fibre, also when the dyeing is performed without or with the addition of only a small amount of sodium carbonate.

The characteristic of the dyestuffs of the present invention is that they possess as residues $B_1$ and/or $B_2$ of the above indicated formula the residue of the 1-amino-5-hydroxy-naphthalene-7-sulfonic acid and that for their manufacture derivatives of 1,3-diaminobenzene containing no solubilizing groups are employed as terminal components.

For the manufacture of unsymmetrical dyestuffs, according to the invention, the tetrazo compound of a 4,4'-diamino-diphenylamine-2-sulfonic acid is combined in any sequence with 1 mole of the 1-amino-5-hydroxy-naphthalene-7-sulfonic acid and 1 mole of another amino-hydroxynaphthalene-sulfonic acid capable of diazotizing and coupling, e. g.

1-amino-8-hydroxynaphthalene-4-sulfonic acid
1-amino-8-hydroxynaphthalene-5-sulfonic acid
1-amino-8-hydroxynaphthalene-6-sulfonic acid
1-amino-6-hydroxynaphthalene-3-sulfonic acid
2-amino-8-hydroxynaphthalene-6-sulfonic acid
2-amino-5-hydroxynaphthalene-7-sulfonic acid
2-amino-6-hydroxynaphthalene-8-sulfonic acid
1-amino-7-hydroxynaphthalene-3-sulfonic acid
1-amino-7-hydroxynaphthalene-4-sulfonic acid The disazo-dyestuffs thus obtained are further tetrazotized and combined with 1,3-diamino compounds of the benzene series.

The effect of the improved dyeing properties is also obtained when using a mixture of 1-amino-5-hydroxy-naphthalene-7-sulfonic acid with other amino-hydroxy-naphthalene-sulfonic acids being capable of diazotizing and coupling, e. g. 2-amino-8-hydroxynaphthalene-6-sulfonic acid and/or 2-amino-5-hydroxynaphthalene-7-sulfonic acid, where the quantities applied of 1-amino-5-hydroxynaphthalene-7-sulfonic acid may even be subnormal.

In place of 4,4'-diaminodiphenylamine-2-sulfonic acid, there may be used also its substitution products containing halogen atoms, alkyl, alkoxy, the carboxylic or the sulfonic acid group.

As terminal component advantageously 1,3-diamino benzene may be used, of which one amino group may be substituted wholly or partially by alkyl, alkoxy, hydroxyalkyl, aralkyl, phenyl residues, of which the benzene nuclei may be substituted further by alkyl, hydroxyalkyl, aralkyl or phenyl residues as well as halogen atoms.

With the aid of the tetrakisazo-dyestuffs produced according to the invention, there may also be improved the dyeing properties of the aforementioned known dyestuffs which contain the 2-amino-8-hydroxynaphthalene-6-sulfonic acid as middle component, by preparing mixtures of the new dyestuffs with those known dyestuffs and using them for dyeing.

In U. S. patent specification No. 2,653,929 (column 3, line 41/42), it is already mentioned that a reddish black shade is obtained when using a dyestuff prepared by tetrazotizing 4,4'-diamino-diphenylamine-2-sulphonic acid, coupling the tetrazo compound with 2 moles of 1-amino-5-hydroxynaphthalene-7-sulfonic acid, further tetrazotizing the disazo-dyestuff and combining the tetrazo compound of the disazo-dyestuff with a mixture of 1,3-diaminobenzene and 1-hydroxynaphthalene. From that indication, the improvement of the dyeing properties in the tetrakisazo-dyestuffs obtained according to this invention could not be foreseen, especially concerning the solubility and affinity for the fibre resulting from the use of the uniform terminal components from the benzene series according to the invention.

The following examples are given for the purpose of illustrating the invention, the parts being by weight and all temperatures in degrees centigrade.

*Example 1*

28 parts of 4,4'-diamino-diphenylamine-2-sulfonic acid are dissolved with water and hydrochloric acid and tetrazotized with sodium nitrite while cooling with ice. The yellow tetrazo solution is combined with an alkaline solution of 47.8 parts of 1-amino-5-hydroxynaphthalene-7-sulfonic acid. After completion of the reaction, the precipitated disazo-dyestuff is filtered and, if necessary, washed with weak solution of sodium chloride. The dyestuff paste is stirred with ice water and further tetrazotized in the usual manner. After removal of the unused nitrous acid, the tetrazo compound in the presence of an excess of sodium carbonate is combined with 21.6 parts of 1,3-diamino-benzene to form the tetrakisazo-dyestuff.

After separating and drying, a dark dyestuff powder is obtained which dissolves in water with only small amounts of sodium carbonate and dyes cotton or rayon deep reddish black shades. The affinity for the fibre is excellent, and uniform dyeings are obtained when dyeing at different degrees of hardness of the water as well as with and without an addition of sodium carbonate. The dischargeability is very good. The dyestuff corresponds to the formula

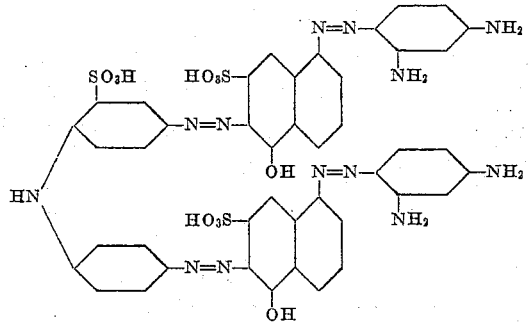

Similar dyestuffs which dye still somewhat more reddish shades are obtained when using as terminal components 1-hydroxyethylamino-3-aminobenzene or 1,3-diamino-4-methylbenzene.

When using as the terminal component the product obtained by acting with 1 mole of glycolchlorohydrin on 1 mole of 4-methyl-1,3-diaminobenzene, a dyestuff is obtained, which dyes a violet-tinged black. 4-methoxy-1,3-diaminobenzene leads to a less reddish black.

Corresponding dyestuffs are obtained by replacing in this example the 4,4'-diamino-diphenylamine-2-sulfonic acid by equivalent amounts of e. g.

4,4'-diamino-diphenylamine-2,3'-disulfonic acid or
4,4'-diamino-diphenylamine-3'-methyl-2-sulfonic acid or
4,4'-diamino-diphenylamine-3'-methoxy-2-sulfonic acid or
4,4'-diamino-diphenylamine-3'-carboxylic-2-sulfonic acid.

*Example 2*

The tetrazo compound from 28 parts of 4,4'-diamino-diphenylamine-2-sulfonic acid is combined in alkaline solution, according to the indications made in Example 1, with a mixture of 32 parts of 2-amino-8-hydroxynaphthalene-6-sulfonic acid and 16 parts of 1-amino-5-hydroxynaphthalene-7-sulfonic acid. The disazo-dyestuff is separated, further tetrazotized, and the tetrazo compound is combined with 21.6 parts of 1,3-diaminobenzene.

After separating and drying, a dark dyestuff powder is obtained, which has a good solubility and dyes cotton or rayon full neutral black shades. The dischargeability and the affinity for the fibre are very good. Also when dyeing without sodium carbonate and in hard water, deep shades are obtained on cotton or rayon. The product is probably a mixture of several dyestuffs the main component of which corresponds to the formula

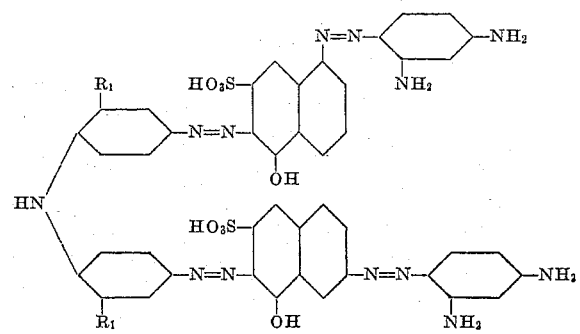

(wherein one $R_1$ means hydrogen, the other $R_1$ a sulfonic acid group).

The middle components (B) and their amounts which are applicable in such mixed couplings can be varied to a large extent.

Thus, it is possible, for example, to obtain also valuable black dyestuffs by replacing partially the 2-amino-8-hydroxy-naphthalene-6-sulfonic acid used in the first paragraph by 2-amino-5-hydroxynaphthalene-7-sulfonic acid.

*Example 3*

The tetrazo solution prepared from 28 parts of 4,4'-diamino-diphenylamine-2-sulfonic acid is rendered alkaline and combined at first with an alkaline solution of the sodium salt from about 26 parts of 1-amino-5-hydroxynaphthalene-7-sulfonic acid to form the diazo-azo-compound. As soon as the tetrazo compound has disappeared, the suspension of the diazo-azo-compound is combined with about 24 parts of 1-amino-8-hydroxynaphthalene-4-sulfonic acid in alkaline medium. The precipitated disazo-dyestuff is further tetrazotized, and the tetrazo compound is combined with an alkaline solution of 21.6 parts of 1,3-diaminobenzene.

The separated and dried tetrakisazo-dyestuff forms a dark powder which dyes cellulose fibres violet-tinged black shades. The affinity for the fibre and the dischargeability are very good.

By variation of the amino-hydroxynaphthalene-sulfonic acids and the terminal components, the shade may be varied optionally.

If, for instance, as middle component in the second place 1-amino-8-hydroxynaphthalene-4-sulfonic acid is replaced by 2-amino-6-hydroxynaphthalene-8-sulfonic acid, a brownish black is obtained, with 2-amino-5-hydroxynaphthalene-7-sulfonic acid a bluish, and with 2-amino-8-hydroxynaphthalene-6-sulfonic acid a somewhat violet-tinged neutral black.

I claim:

1. A tetrakisazo-dyestuff of the general formula

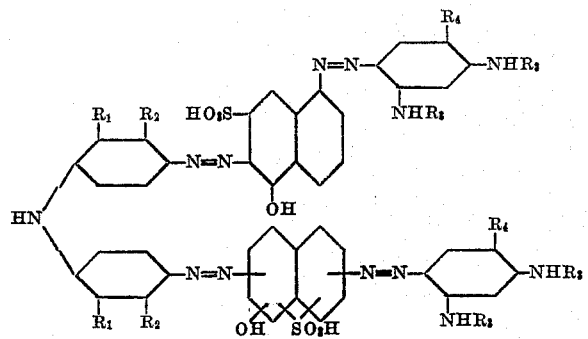

wherein:

one $R_1$ means hydrogen, the other $R_1$ a sulfonic acid group;

one $R_2$ means hydrogen, the other $R_2$ a radical of the group consisting of hydrogen, methyl, methoxy, carboxylic acid and sulfonic acid group;

$R_3$ means a radical of the group consisting of hydrogen and hydroxyethyl;

$R_4$ means a radical of the group consisting of hydrogen, methyl and methoxy.

2. A tetrakisazo-dyestuff of the general formula

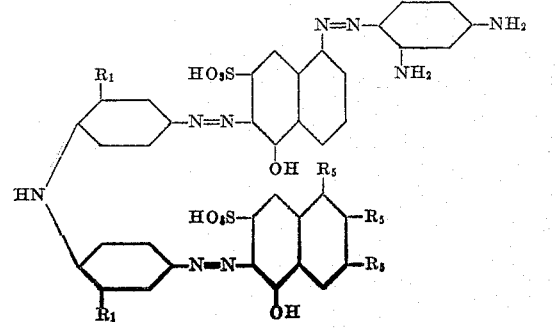

wherein one $R_1$ means hydrogen, the other $R_1$ a sulfonic acid group, and two $R_5$'s mean hydrogen, the other $R_5$ means the group

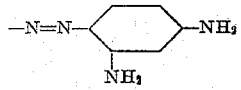

3. The tetrakisazo-dyestuff of the formula

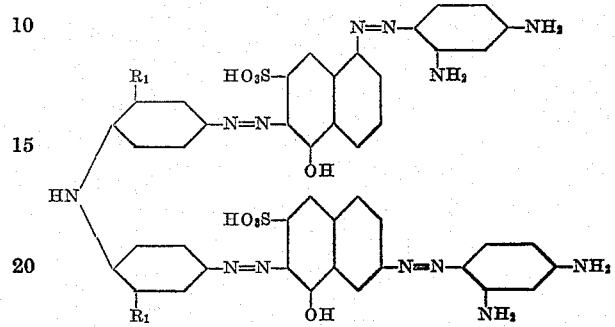

wherein one $R_1$ means hydrogen, the other $R_1$ a sulfonic acid group.

4. The tetrakisazo-dyestuff of the formula

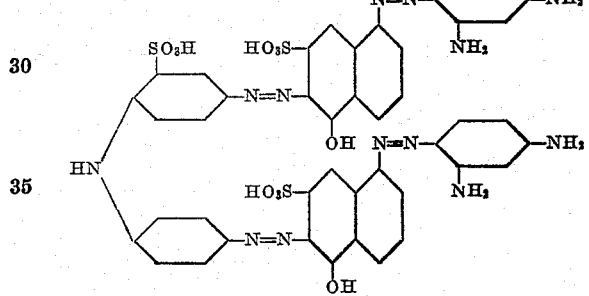

References Cited in the file of this patent
UNITED STATES PATENTS

| | | |
|---|---|---|
| 595,021 | Kahn et al. | Dec. 7, 1897 |
| 2,096,896 | Hauck et al. | Oct. 26, 1937 |
| 2,418,416 | Locke | Apr. 1, 1947 |
| 2,653,929 | Fleischhauer et al. | Sept. 29, 1953 |